United States Patent [19]

Ishikawa et al.

[11] Patent Number: 6,117,510
[45] Date of Patent: Sep. 12, 2000

[54] ADHESIVE-APPLIED TAPE

[75] Inventors: Seiji Ishikawa; Hiroshi Yasuno, both of Ichihara, Japan

[73] Assignee: Ube Industries, Ltd., Ube, Japan

[21] Appl. No.: 08/901,659

[22] Filed: Jul. 28, 1997

[30] Foreign Application Priority Data

Jul. 30, 1996 [JP] Japan .................................. 8-200176

[51] Int. Cl.⁷ ........................................................ C09J 7/02
[52] U.S. Cl. .................... 428/41.7; 428/41.8; 428/355 R; 428/355 EP; 428/355 N
[58] Field of Search ................................ 428/41.7, 41.8, 428/343, 355 R, 355 EP, 355 N

[56] References Cited

U.S. PATENT DOCUMENTS

| | | |
|---|---|---|
| 5,180,627 | 1/1993 | Inoue et al. . |
| 5,252,703 | 10/1993 | Nakajima et al. . |
| 5,508,228 | 4/1996 | Nolan et al. . |
| 5,643,986 | 7/1997 | Ishikawa et al. . |
| 5,869,161 | 2/1999 | Choi . |
| 5,935,372 | 8/1999 | Rojstaczer et al. . |

FOREIGN PATENT DOCUMENTS

| | | |
|---|---|---|
| 0676456 | 10/1995 | European Pat. Off. . |
| 4-36321 | 2/1992 | Japan . |
| 5-25453 | 2/1993 | Japan . |
| 6-200216 | 7/1994 | Japan . |
| 6-306338 | 11/1994 | Japan . |

*Primary Examiner*—Jenna Davis
*Attorney, Agent, or Firm*—Finnegan, Henderson, Farabow, Garrett & Dunner, L.L.P.

[57] ABSTRACT

An adhesive-applied tape prepared by coating a support film with a solution obtained by dissolving in an organic solvent a mixture of an epoxy resin and an amorphous polyimidosiloxane produced from an aromatic tetracarboxylic dianhydride or its derivative and a diamine comprising an aromatic diamine which comprises an aromatic diamine having a functional group which can react with an epoxy group and a diaminopolysiloxane, and then drying it at a temperature at which the epoxy resin is not cured to provide a tack-free adhesive layer with no surface tackiness. The tape is both flexible and heat resistant, and does not require high-temperature, high-pressure contact bonding conditions upon contact bonding.

10 Claims, No Drawings

ADHESIVE-APPLIED TAPE

BACKGROUND OF THE INVENTION

1. Field of the Invention

The present invention relates to an adhesive-applied tape, and particularly it relates to an adhesive-applied tape consisting of a support film provided with an adhesive layer containing a mixture of an amorphous polyimidosiloxane and an epoxy resin, as well as to an adhesive-applied tape which is further covered with a releasable protective film having surface tackiness.

The adhesive-applied tape of the present invention requires no high-temperature contact bonding and thus has high electrical reliability, while the adhesive layer is flexible to thus minimize warpage resulting from the adhesive layer, and it may therefore be suitably used for electronic parts which require heat resistance.

2. Description of the Related Art

Laminated boards, including flexible circuit boards, have conventionally been produced using adhesives of epoxy resins or the like to adhere substrates of polyimide films or the like to metal layers, and although the polyimide films themselves have excellent heat resistance there exists a problem in the poor reliability of the epoxy resin adhesives.

Polyimide films are often directly attached to copper foil conductors, but since conventionally used polyimide films are in the form of polyimide-based precursors when applied onto metal foils they require heat treatment at 350–450° C., which causes heat deterioration of the copper foils.

Processes are also known which do not use epoxy resins but involve direct casting of polyimide dope solutions onto the copper foils followed by heat treatment; however, since heated contact bonding at high temperature is necessary for increased productivity, problems such as deterioration and warping of the copper foils have resulted.

On the other hand, TAB tapes which conventionally employ adhesives such as B-stage epoxy resins on polyimide films are associated with a number of problems, including warping, problems with migration characteristics, difficulties with fine pitch matching, problems in terms of pot-life (storage stability), required prebaking for long periods of about 10 hours at 50° C. for attachment to copper foils after punching, and squeeze-out or exudation of the adhesive layer.

For these reasons, although many different polyimide-based adhesives have been proposed, they still have problems in that warping occurs when they have excellent heat resistance, or else they have insufficient adhesive strength and inferior heat resistance.

Furthermore, known adhesives which are formed into tapes have been found to have such problems as reduced adhesive strength of the laminates which employ such adhesive tapes, due to adhesion of dirt onto the adhesive.

In other words, with the use of conventional adhesives and adhesive-applied tapes (or films) it has not been possible to obtain adhesive-applied tapes which do not require high-temperature and high-pressure contact bonding conditions for contact bonding, which undergo substantially no warping of the laminate as a result of the adhesive under high-temperature heating, which have excellent migration characteristics of the adhesive layer, which have no exudation of the adhesive, have satisfactory storage stability and undergo minimal squeeze-out when pasted to metal foils.

SUMMARY OF THE INVENTION

It is an object of the present invention to provide an adhesive-applied tape which overcomes the problems described above by satisfying the mutually contradictory conditions of requiring no heated contact bonding at high temperature and being temperature resistant.

The present invention provides an adhesive-applied tape prepared by coating at least one side of a support film with an organic solvent solution of a polyimidosiloxane composition comprising a mixture of an epoxy resin and an amorphous polyimidosiloxane produced from an aromatic tetracarboxylic acid, or a dianhydride or ester thereof, a diaminopolysiloxane and an aromatic diamine comprising an aromatic diamine having in the benzene ring at least one functional group which can react with an epoxy group, and then treating the coated layer at a temperature which produces substantially no curing of the epoxy resin, to provide a tack-free adhesive layer with no surface tackiness.

The present invention also provides an adhesive-applied tape which is formed by coating at least one side of a support film with an organic solvent solution of a polyimidosiloxane composition comprising a mixture of an epoxy resin and an amorphous polyimidosiloxane produced from an aromatic tetracarboxylic acid or a dianhydride or ester thereof, a diaminopolysiloxane and an aromatic diamine comprising an aromatic diamine having in the benzene ring at least one functional group which can react with an epoxy group, and then treating the coated layer at a temperature which produces substantially no curing of the epoxy resin, to provide a tack-free adhesive layer with no surface tackiness, and then covering the adhesive layer with a releasable protective film having surface tackiness, preferably with a releasable protective film with a low boiling point organic solvent supplied at the interface between the adhesive layer and the protective film to provide surface tackiness.

DESCRIPTION OF THE PREFERRED EMBODIMENTS

As the support film usable in the present invention there may be mentioned films, especially heat-resistant resin films and particularly polyimide films, which normally have a thickness of about 5–150 $\mu$m and preferably about 25–150 $\mu$m. The support film should be clean, and it may be subjected or not subjected to surface-active treatment by plasma treatment, corona discharge treatment, ozone treatment or surface-active treatment with a silane coupling agent or organic metal or the like.

In particular, as the support film there may be suitably used aromatic polyimide films with a linear thermal expansion coefficient (50–200° C.) of $0.4 \times 10^{-5} - 2.5 \times 10^{-5}$ cm/cm/° C., and especially a thermal shrinkage (50–200° C.×2 hours) of 0.05% or lower.

Such aromatic polyimide films are preferably produced by heat drying 3,3',4,4'-biphenyltetracarboxylic dianhydride (in combination with pyromellitic dianhydride as necessary) and paraphenylenediamine (in combination with paradiaminodiphenyl ether as necessary) at any desired maximum heating temperature selected within the range of 350–500° C.

The adhesive layer is obtained from a composition prepared by dissolving in an organic solvent a polymer component consisting of a mixture comprising an epoxy resin and an amorphous polyimidosiloxane having in the benzene ring at least one functional group which can react with an epoxy group, for example, through treatment to evaporate off the solvent.

The amorphous polyimidosiloxane component of the adhesive is an amorphous polyimidosiloxane having in the polymer benzene ring at least one functional group which can react with an epoxy group, and it may be obtained by polymerizing in an organic solvent an aromatic tetracarboxylic acid or a dianhydride or ester (lower alkyl ester) thereof with a diamine comprising an aromatic diamine having in the benzene ring at least one functional group such as an OH group or COOH group which can react with an epoxy group and a diaminopolysiloxane, if necessary also with an aromatic diamine having in the molecule no functional group, other than the diamine group, which can react with an epoxy group and then performing imidization by heat imidization or chemical imidization.

The aforementioned aromatic tetracarboxylic acid or its dianhydride or ester may be an aromatic dicarboxylic acid component containing at least 80 mole percent of, for example, 2,3,3',4'-biphenyltetracarboxylic acid, 3,3',4,4'-biphenyltetracarboxylic acid, 3,3',4,4'-diphenylether tetracarboxylic acid. 3,3',4,4'-diphenylsulfone tetracarboxylic acid, 3,3',4,4'-benzophenone tetracarboxylic acid, 2,2-bis(3,4-dicarboxybenzene)-hexafluoropropane, pyromellitic acid, 1,4-bis(3,4-dicarboxybenzene)benzene, 2,2-bis[4-(3,4-dicarboxyphenoxy)phenyl]propane, or a dianhydride or lower alcohol ester of one of these acids.

Among these are preferred 2,3,3',4'-biphenyltetracarboxylic acid, 3,3',4,4'-diphenylether tetracarboxylic acid and their dianhydrides or esters, particularly 2,3,3',4'-biphenyltetracarboxylic dianhydride and its esters, because they give amorphous polyimides with most diamine components, resulting in low warping of the laminates, and provide excellent adhesion, heat resistance and solubility of the amorphous polyimidosiloxane in organic solvents (i.e., highly concentrated polymer solutions can be obtained).

As the aromatic diamine compound having at least one functional group, such as OH, which can react with an epoxy group there may be mentioned, for example, diaminophenol compounds such as 2,4-diaminophenol, hydroxybiphenyl compounds such as 3,3'-diamino-4,4'-dihydroxybiphenyl, 4,4'-diamino-3,3'-dihydroxybiphenyl, 4,4'-diamino-2,2'-dihydroxybiphenyl and 4,4'-diamino-2,2',5,5'-tetrahydroxybiphenyl, hydroxydiphenylalkane compounds such as 3,3'-diamino-4,4'-dihydroxydiphenylmethane, 4,4'-diamino-3,3'-dihydroxydiphenylmethane, 4,4'-diamino-2,2'-dihydroxydiphenylmethane, 2,2-bis[3-amino-4-hydroxyphenyl]propane, 2,2-bis[4-amino-3-hydroxyphenyl]propane, 2,2-bis[3-amino-4-hydroxyphenyl]hexafluoropropane and 4,4'-diamino-2,2',5,5'-tetrahydroxydiphenylmethane, hydroxydiphenyl ether compounds such as 3,3'-diamino-4,4'-dihydroxydiphenyl ether, 4,4'-diamino-3,3'-dihydroxydiphenyl ether, 4,4'-diamino-2,2'-dihydroxydiphenyl ether and 4,4'-diamino-2,2',5,5'-tetrahydroxydiphenyl ether, hydroxydiphenylsulfone compounds such as 3,3'-diamino-4,4'-dihydroxydiphenylsulfone, 4,4'-diamino-3,3'-dihydroxydiphenylsulfone, 4,4'-diamino-2,2'-dihydroxydiphenylsulfone and 4,4'-diamino-2,2',5,5'-tetrahydroxydiphenylsulfone, bis(hydroxyphenoxyphenyl) alkane compounds such as 2,2-bis[4-(4-amino-3-hydroxyphenoxy)phenyl]propane, bis(hydroxyphenoxy) biphenyl compounds such as 4,4'-bis(4-amino-3-hydroxyphenoxy)biphenyl, and bis (hydroxyphenoxyphenyl)sulfone compounds such as 2,2-bis[4-(4-amino-3-hydroxyphenoxy)phenyl]sulfone.

As the aromatic diamine compound having at least one functional group, such as COOH, which can react with an epoxy group there may be mentioned, for example, diaminobenzenecarboxylic acids such as 3,5-diaminobenzoic acid and 2,4-diaminobenzoic acid, carboxybiphenyls such as 3,3'-diamino-4,4'-dicarboxybiphenyl, 4,4'-diamino-2,2'-dicarboxybiphenyl, 4,4'-diamino-2,2',5,5'-tetracarboxybiphenyl and 4,4'-diamino-3,3'-dicarboxybiphenyl, carboxydiphenylalkane compounds such as 3,3'-diamino-4,4'-dicarboxydiphenylmethane, 4,4'-diamino-3,3'-dicarboxydiphenylmethane, 2,2-bis[4-amino-3-carboxydiphenyl]propane and 2,2-bis[3-amino-4-carboxyphenyl]-hexafluoropropane, carboxydiphenylsulfone compounds such as 3,3'-diamino-4,4'-dicarboxydiphenylsulfone, 4,4'-diamino-3,3'-dicarboxydiphenylsulfone, 4,4'-diamino-2,2'-dicarboxydiphenylsulfone and 4,4'-diamino-2,2',5,5'-tetrahydroxydiphenylsulfone, bis(carboxyphenoxyphenyl) alkane compounds such as 2,2-bis[4-(4-amino-3-carboxyphenoxy)phenyl]propane, bis(carboxyphenoxy) biphenyl compounds such as 4,4'-bis(4-amino-3-carboxyphenoxy)biphenyl and bis(carboxyphenoxyphenyl) sulfone compounds such as 2,2-bis[4-(4-amino-3-carboxyphenoxy)phenyl]sulfone.

Preferred as the aforementioned diaminopolysiloxane are those with siloxane bond numbers (average) of 5–30, and particularly 5–20. The diaminopolysiloxane is usually produced as a mixture of compounds with different siloxane bond numbers of 3 to 100. As specific examples of diaminopolysiloxane compounds there may be mentioned α,ω-bis(2-aminoethyl)polydimethylsiloxane, α,ω-bis(3-aminopropyl)polydimethylsiloxane, α,ω-bis(4-aminophenyl)polydimethylsiloxane, α,ω-bis(4-amino-3-methylphenyl)polydimethylsiloxane, α,ω-bis(3-aminopropyl)polydiphenylsiloxane and α,ω-bis(4-aminobutyl)polydimethylsiloxane.

As the aforementioned aromatic diamine (with no functional group which can react with an epoxy group) there may be mentioned, for example, amines containing one benzene ring such as 1,4-diaminobenzene, 1,3-diaminobenzene, 2,4-diaminotoluene and 1,4-diamino-2,5-dihalogenobenzene, diamines containing two benzene rings such as bis(4-aminophenyl) ether, bis(3-aminophenyl) ether, bis(4-aminophenyl)sulfone, bis(3-aminophenyl)sulfone, bis(4-aminophenyl)methane, bis(3-aminophenyl)methane, bis(4-aminophenyl)sulfide, bis(3-aminophenyl)sulfide, 2,2-bis(4-aminophenyl)propane, 2,2-bis(3-aminophenyl)propane, 2,2-bis(4-aminophenyl)hexafluoropropane, o-dianisidine, o-toluidine and toluidinesulfonic acid, diamines containing three benzene rings such as 1,4-bis(4-aminophenoxy) benzene, 1,4-bis(3-aminophenoxy)benzene, 1,4-bis(4-aminophenyl)benzene, 1,4-bis(3-aminophenyl)benzene, α,α'-bis(4-aminophenyl)-1,4-diisopropylbenzene and α,α'-bis(4-aminophenyl)-1,3-diisopropylbenzene, and aromatic diamines containing four or more benzene rings, such as 2,2-bis[4-(4-aminophenoxy)phenyl]propane, 2,2-bis[4-(4-aminophenoxy)phenyl]hexafluoropropane, 2,2-bis[4-(4-aminophenoxy)phenyl]sulfone, 4,4'-(4-aminophenoxy) biphenyl, 9,9-bis(4-aminophenyl)fluorene and 5,10-bis(4-aminophenyl)anthracene.

Particularly preferred as the aromatic diamine are "flexible aromatic diamines" which have 2 or more benzene rings with the bonds between the benzene rings being formed by flexible groups (for example, sulfone groups, oxy groups, bisphenoxypropane groups, dioxybenzene groups, etc.), among which is particularly preferred 2,2-bis[4-(4-aminophenoxy)phenyl]propane because it is readily obtainable and gives thermally stable polyimidosiloxanes.

The amorphous polyimidosiloxane usable for the present invention preferably contains each of the components of the diamine component, which are the aromatic diamine having at least one (preferably 1–2) group, such as an OH group or COOH group (COOH groups being particularly preferred), which is reactable with an epoxy group, the diaminopolysiloxane and the aromatic diamine, in respective proportions of 1–40 mole percent, particularly 2–40 mole percent and especially 5–35 mole percent of the aromatic diamine having a functional group such as OH or COOH which can react with an epoxy group, 10–95 mole percent (with a total of 100 mole percent), particularly 40–85 mole percent, and especially 45–80 mole percent of the diaminopolysiloxane, and 0–60 mole percent, particularly 5–50 mole percent of the aromatic diamine.

When the proportions of the components are outside of these ranges the features including low warping of the adhesive layer, adhesion, heat resistance (including solder heat resistance) and solubility may be impaired.

The amorphous polyimidosiloxane may be obtained, for example, in the following manner.

A process for obtaining the polyimidosiloxane may employ the aromatic tetracarboxylic acid component and diamine component in approximately equimolar amounts, with polymerization and imidization carried out continuously in an organic polar solvent at 15–250° C.

Alternatively, there may be employed a process wherein the diamine components are separated, an excess of the aromatic tetracarboxylic acid component is first polymerized with the diaminopolysiloxane in an organic polar solvent at 15–250° C. and then imidized to prepare an imidosiloxane oligomer, having terminal acid or acid anhydride groups, which has an average polymerization degree of about 1–10 while the aromatic tetracarboxylic acid component is polymerized separately with an excess of another diamine component in an organic polar solvent at 15–250° C. and then imidized to prepare an imide oligomer having terminal amino groups which has an average polymerization degree of 1–10, and finally the two are combined in approximately equimolar amounts of the acid component and diamine component, reacted at 15–60° C. and then further heated to 130–250° C., to obtain a block-type polyimidosiloxane.

As another process, the polyimidosiloxane may be obtained by first polymerizing the aromatic tetracarboxylic acid component and diamine component in approximately equimolar amounts in an organic polar solvent at 20–80° C. to obtain a polyamic acid, and then imidizing it.

As the organic polar solvent to be used to obtain the aforementioned polyimidosiloxane there may be mentioned nitrogen-containing solvents such as N,N-dimethylacetamide, N,N-diethylacetamide, N,N-dimethylformamide, N,N-diethylformamide, N-methyl-2-pyrrolidone, 1,3-dimethyl-2-imidazolidinone and N-methylcaprolactam, sulfur atom-containing solvents such as dimethylsulfoxide, diethylsulfoxide, dimethylsulfone, diethylsulfone and hexamethylsulforamide, phenolic solvents such as cresol, phenol and xylenol, Glyme-type solvents such as diethyleneglycol dimethyl ether (diglyme), triethyleneglycol dimethyl ether (triglyme) and tetraglyme, solvents with an oxygen atom in the molecule such as acetone, methanol, ethanol, ethylene glycol, dioxane and tetrahydrofuran, as well as pyridine, tetramethylurea and the like.

If necessary, aromatic hydrocarbon solvents such as benzene, toluene and xylene or other organic solvents such as solvent naphtha and benzonitrile may also be used in combination therewith.

In the present invention, the amorphous polyimidosiloxane may be obtained by any of the aforementioned processes, but it is preferred to be one which has as high a molecular weight as possible, a high imidization efficiency and which dissolves in organic polar solvents at a high concentration of at least 3 wt %, and preferably from 5–60 wt %, especially about 5–50 wt %, with a solution viscosity of 1–10,000 poise, and particularly 10–2000 poise as measured at 25° C. (with an E-type rotational viscometer).

The amorphous polyimidosiloxane preferably has an imidization rate of 90% or greater and particularly 95% or greater, and as a measure of the molecular weight those with an inherent viscosity (measuring concentration: 0.5 g/100 milliliters, solvent: N-methyl-2-pyrrolidone, measuring temperature: 30° C.) of 0.16 or greater, preferably 0.17 or greater and particularly 0.17-3, or even 0.17-2, are preferred from the standpoint of storage stability (viscosity change coefficient) and soldering heat resistance of the laminate.

Incidentally, "amorphous" means that the degree of crystallinity has no peak as measured by wide-angle X-ray diffraction (reflection method).

According to the invention, an epoxy resin is used as a polymer component with the amorphous polyimidosiloxane having the specific structure described above.

An aromatic epoxy compound (hereinafter sometimes to be abbreviated simply to "epoxy") used for the epoxy resin is preferably a liquid or solid aromatic epoxy resin with about 100–1000 epoxy equivalents and a molecular weight of about 300–5000. As examples there may be mentioned bisphenol A-type or bisphenol F-type epoxy resins (Epikote 806, Epikote 825, etc. produced by Yuka Shell Co.) and aromatic epoxy resins with 3 or more functional groups (Epikote 152, Epikote 154, Epikote 180 series, Epikote 157 series, Epikote 1032 series produced by Yuka Shell Co. and MT0163 produced by Ciba-Geigy Co.).

According to the invention, the amount of the epoxy resin to be used may be an amount no greater than 50 parts by weight, preferably 1–50 parts by weight and more preferably 5–40 parts by weight, per 100 parts by weight of the amorphous polyimidosiloxane. It is not preferred for the amount to be excessively high since this may result in gelation of the composition, lower heat resistance of the laminated panel obtained by heated contact bonding of the adhesive-applied tape and metal layer via the adhesive layer, reduction in the migration characteristics and flexibility of the adhesive layer, and difficulty in achieving miniature size. Also, if no epoxy resin is used the adhesion and solvent resistance are lowered.

When the epoxy resin is in liquid form so that it can function as the organic solvent for the amorphous polyimidosiloxane, the use of other common organic solvents may be omitted.

In such cases, the treatment described above will mean uniform mixture including heating, while the drying may be omitted.

Additives such as hydrazides and imidazoles may also be used with the epoxy resin to promote curing of the epoxy resin.

According to the invention, an inorganic filler may also be used with the polyimidosiloxane composition.

The inorganic filler is preferably at least one selected from talc, mica and barium sulfate. The talc preferably has an average particle size of 1–20 µm, such as Microace P-3 (average particle size: 1.8 µm) produced by Nihon Talc Co. The mica or barium sulfate may be of any size or shape, but will preferably have an average particle size of 0.1–25 µm, such as HiMod 450 (average particle size: 17 µm) or C-4000 (average particle size: 22 µm) produced by Shiraishi Industries, KK. or MK-100 (average particle size: 2.6 µm) produced by Cope Chemicals, KK. The barium sulfate is preferably B-30 or B-54, produced by Sakai Industries, KK. Polymer layers obtained using the substances outside of these ranges are not preferred as they undergo cracking when bent and become whitened at folded sections.

According to the invention, the amount of the inorganic filler to be used may be a total of 0–150 parts by weight, preferably 2–150 parts by weight and more preferably 10–80 parts by weight per 100 parts by weight of the aforementioned amorphous polyimidosiloxane. These ranges are preferred because if the amount is too great or too little cracking may occur upon bending of laminates obtained using the adhesive-applied tape, and the soldering heat resistance of the laminates may be impaired.

It is also preferred to add a silicone-based thickening component, for example Aerosil (fine powdered silica) produced by Nihon Aerosil Co., in an amount of preferably 1–50 parts by weight and particularly 5–40 parts by weight per 100 parts by weight of the amorphous polyimidosiloxane.

According to the invention, the organic solvent solution of the polyimidosiloxane composition may be easily obtained by adding prescribed amounts of the aforementioned amorphous polyimidosiloxane, epoxy resin and, optionally talc, mica or barium sulfate and silicone, to the organic solvent and uniformly stirring and mixing the components. The mixing may be performed in a suitable amount of an organic solvent to make a solution composition. When preparing the solution composition dissolved in the organic solvent, the polymerization solution of the amorphous polyimidosiloxane may be used directly, or the polymerization solution may be further diluted with an appropriate amount of organic solvent. Alternatively, after isolating and collecting the amorphous polyimidosiloxane it may be dissolved in an organic solvent of the same or a different type than the organic solvent used for the polymerization.

The organic solvent may be an organic polar solvent of the same type which may be used to obtain the aforementioned amorphous polyimidosiloxane, but an organic solvent with a boiling point of from 100° C. to 250° C., for example a boiling point of 180° C. or higher and particularly 200° C. or higher for example, a Glyme-type solvent such as methyl triglyme is ideal for use since it has very low dissipation of the solvent due to evaporation, and thus is highly suitable for coating.

The concentration of the organic high molecular component in the organic solvent solution of the polyimidosiloxane composition (adhesive solution composition) may be usually appropriate at 5–60 wt %, preferably 5–50 wt % and particularly 10–45 wt %, and the solution viscosity may be appropriate at 1–10,000 poise and preferably 10–2000 poise (25° C., E-type rotational viscometer) from the standpoint of workability, solution properties and the characteristics of the resulting laminate.

According to the invention, either side or both sides of a support film which usually has a thickness of about 5–150 µm are coated (either simultaneously or in two stages) with the above-mentioned adhesive solution composition, preferably to give an adhesive layer thickness of 2–50 µm after drying and other treatments, and the film is then subjected to a treatment including heating to dryness at a temperature which produces substantially no curing (crosslinking) of the epoxy resin, preferably a temperature of 80–100° C., to remove the organic solvent and give a tack-free adhesive layer with no surface tackiness.

When the adhesive layer is not tack-free, because a residue of the solvent remains in the adhesive layer, there may be caused problems such as blistering during heating in the mounting step when preparing a combined panel with copper foil.

The adhesive layer preferably has a tensile modulus (25° C.) of 10–150 kgf/mm² and an elongation of 10–80% as measured with a 25 µm-thick film prepared by heating and drying the composition at 80° C. for 60 minutes.

According to the invention, a releasable protective film may be provided over the adhesive layer side in order to prevent blocking with the support film and to preserve the adhesive strength of the adhesive layer, and in such cases a low boiling point organic solvent is preferably supplied at the interface between both layers to impart surface tackiness to the protective film. If the adhesive-applied tape is prepared without imparting surface tackiness to the protective film with a low boiling point organic solvent, the lack of adhesion to the protective film may result in waviness and wrinkles, making it impossible to obtain a proper adhesive-applied tape.

There are no particular restrictions on the protective film, and any resin film with satisfactory surface smoothness, such as a polyethylene, polypropylene, poly-4-methylpentene-1 or polyester film, may be used. The thickness of the protective film is preferably about 5–25 µm.

As the low boiling point organic solvent to be used according to the invention there may be mentioned ketone compounds, ether compounds and aromatic hydrocarbons with boiling points of about 80–250° C., specific examples thereof including ketones such as methyl ethyl ketone, methyl-n-propyl ketone, methyl-n-butyl ketone, methyl isobutyl ketone and diisobutyl ketone, alcohols such as isopropyl alcohol, isobutyl alcohol, n-hexyl alcohol and ethyl hexyl alcohol, esters such as ethyl acetate, n-propyl acetate, n-amyl acetate and diethyl maleate, ethers such as ethyleneglycol dimethyl ether, diethyleneglycol dimethyl ether and triethyleneglycol dimethyl ether, and hydrocarbons such as n-heptane, cyclohexanetoluene, xylene, styrene, isopropylbenzene and triethylbenzene.

The method of supplying the aforementioned low boiling point organic solvent at the interface between the layers may involve, for example, thinly coating the aforementioned low boiling point organic solvent onto the protective film, for example to a thickness of 1–3 µm, and then combining it with the adhesive surface (dried coating surface) to cover the protective film.

The adhesive-applied tape according to the present invention exhibits superior performance, providing heat resistance including soldering heat resistance and overcoming such problems as migration and effusion of the adhesive; it can therefore be suitably used as a material for compact electronic parts in liquid crystal driving circuits and BGA or CSP boards, etc., which will continue to require especially high density.

Examples and comparative examples will now be given for illustrating the present invention. The measurements and evaluations made in the examples were conducted according to the following methods.

Measurement of Inherent Viscosity (ηinh)

The inherent viscosity (ηinh) of the polyimidosiloxane reaction solution may be expressed by the following equation.

$$\eta inh = \ln(t/t_0)/c$$

where t is the time (seconds) for the measuring solution to pass between gauge marks on a Cannon-Fenske viscometer, $t_0$ is the time (seconds) for the pure solvent to pass between gauge marks on a Cannon-Fenske viscometer, and c is the polyimidosiloxane solid concentration (g/100 ml solvent).

The viscosity was measured at 30° C. using an N-methyl-2-pyrrolidone solvent, and the polyimidosiloxane solid concentration was 0.5 g/100 ml.

Method of Measuring Soldering Heat Resistance

A laminate prepared using the adhesive-applied tape was cut into a 3×3 cm section and the protective film side thereof was contacted for 3 minutes with a molten solder bath at 300° C., and after cooling an evaluation was made based on the presence or absence of blistering of the laminate.

Measurement of Crystallinity

This was accomplished using a Model RINT200 rotating anticathode-type X-ray diffraction apparatus produced by Rigaku Co., with CuKα1 as the X-ray source, a tube voltage of 40 KV, a tube current of 130 mA and a scanning speed of 10°/min.

Measurement of Other Physical Properties

Measurement of thermal linear expansion coefficient (50–200° C.): A sample heated to 300° C. for 30 minutes and stress-relaxed was measured with a TMA apparatus (tension mode, 2 g load, 10 mm sample length, 20° C./min).

Measurement of thermal shrinkage (200° C.×2 hours): An 80×80 mm test piece was allowed to stand for 24 hours under standard conditions (23±2° C.) and a relative humidity of 65±5%, and then the length between reference points was measured and calculated by the following equation.

Thermal shrinkage (%)=$[(L_1-L_2)/L_1] \times 100$

In the above equation, $L_1$ represents the length (mm) between the reference points before heating and $L_2$ represents the length (mm) between the reference points after heating.

Measurement of tensile modulus and elongation: An adhesive composition was heated to dryness at 80° C. for 60 minutes to obtain a 25 μm-thick film and the resulting film was subjected to the measurement for its tensile modulus and elongation according to the method of ASTM D882.

Evaluation of Adhesive Layer Migration

A direct current was introduced to a combshaped electrode (30 μm lines and spaces) prepared from a laminated board obtained using the adhesive-applied tape, by applying a direct current voltage of 30 V for 1000 hours in an atmosphere at 85° C. and 85% relative humidity (RH).

An evaluation was made based on the presence or absence of shorts, and those samples with absolutely no shorts were judged as having excellent migration characteristics.

[Production of Amorphous Polyimidosiloxane]

Reference Example 1

Into a 500 ml glass flask there were charged 2,3,3',4'-biphenyltetracarboxylic dianhydride (100 millimoles, molar ratio, same hereunder) and 130 g of triglyme (b.p. 250° C.), heat stirring was conducted at 180° C. in a nitrogen atmosphere. After adding α,ω-bis(3-aminopropyl) polydimethylsiloxane (480 amino equivalents, n=10.6) (70 millimoles) and 50 g of triglyme, the mixture was further heated and stirred at 180° C. for 60 minutes. After further adding 3,5-diaminobenzoic acid (15 millimoles), 2,2-bis[4-(4-aminophenoxy)phenyl]propane (15 millimoles) and 50 g of triglyme to the reaction solution and heating and stirring at 180° C. for 6 hours, the mixture was filtered. The resulting polyimidosiloxane reaction solution had a polymer solid concentration of 41 wt %, a ηinh of 0.17 and a solution viscosity of 50 poise. The imidization rate was essentially 100%, and the crystallinity was 0%, or amorphous. To this polyimidosiloxane solution there were added 18 parts by weight of an epoxy resin (157S70, product of Yuka Shell Co.) and 18 parts by weight of Aerosil 200 per 100 parts by weight of the polyimidosiloxane to obtain a liquid adhesive composition.

Reference Example 2

A liquid adhesive composition was obtained in the same manner as Reference Example 1 except that the amounts of α,ω-bis(3-aminopropyl) polydimethylsiloxane (480 amino equivalents, n=10.6) (55 millimoles), 2,2-bis[4-(4-aminophenoxy) phenyl]propane (30 millimoles) and 3,5-diaminobenzoic acid (15 millimoles) were changed to 55, 30 and 15 millimoles, respectively.

The crystallinity of the polyimidosiloxane of this example was 0%.

Reference Example 3

A liquid adhesive composition was obtained in the same manner as Reference Example 1 except that the 3,5-diaminobenzoic acid was replaced with 4,4'-diamino-3,3'-dihydroxybiphenyl (15 millimoles).

The crystallinity of the polyimidosiloxane of this example was 0%.

Reference Example 4

A liquid adhesive composition was obtained by adding 20 parts by weight of talc (Microace P-3, product of Nihon Talc Co.) per 100 parts by weight of the amorphous polyimidosiloxane in the adhesive solution of Reference Example 1.

Reference Example 5

A liquid adhesive composition was obtained in the same manner as Reference Example 1, except that the 3,5-diaminobenzoic acid was not used, and the amount of the 2,2-bis[4-(4-aminophenoxy) phenyl]propane was changed to 30 millimoles.

The crystallinity of the polyimidosiloxane of this example was 0%.

Reference Example 6

A liquid adhesive composition was obtained in the same manner as Reference Example 1, except that the 3,5-diaminobenzoic acid was not used, the amount of the 2,2-bis[4-(4-aminophenoxy) phenyl]propane was changed to 30 millimoles, and no epoxy resin was added.

Example 1

A 75 μm-thick polyimide film (linear thermal expansion coefficient: $2.1 \times 10^{-5}$ cm/cm/° C., thermal shrinkage: 0.02%) was coated with the adhesive composition of Reference Example 1 in an amount so as to result in a final thickness of 20 μm, and then dried at 80° C. for 60 minutes to obtain an adhesive-applied tape with a tack-free adhesive layer.

The adhesive side of the resulting adhesive-applied tape was then coated with xylene to a thickness of 2 μm using a roll coater and then covered with a polyester film (Lumina, product of Toray Industries Inc., 12.5 μm) to obtain an adhesive-applied tape covered with a protective film.

The results of evaluating the resulting adhesive-applied tape are shown in Table 1.

Excellent performance was exhibited upon evaluating the migration characteristics of a separate adhesive layer at 85°

C. and 85% relative humidity, under conditions of 1000 hours with a 50 μm pitch circuit and 30 V DC.

The storage stability of the adhesive-applied tape covered with the protective film was evaluated by keeping it at 25° C. for 240 hours, releasing the protective film, and then heating it to 160° C. for 60 minutes after 3 minutes of compression with an electrolytic copper foil at a pressure of 10 Kg/cm² and measuring the 90° peel strength. The results indicated an adhesive strength of 1.30 kg/cm and satisfactory storage stability.

Separately it was attempted to obtain an adhesive-applied tape by covering the adhesive side of the aforementioned adhesive-applied tape with a polyester film without applying the low boiling point organic solvent, but due to a lack of adhesion the polyester film produced waviness and wrinkles when applied, making it impossible to obtain a proper adhesive-applied tape.

Examples 2–4

The same procedure as in Example 1 was carried out except that the adhesive composition of Reference Example 2, 3 or 4 were used instead of the adhesive composition of Reference Example 1.

The results are summarized in Table 1.

The migration characteristics of the adhesive layers were separately evaluated in the same manner as Example 1, and all exhibited excellent performance.

The storage stabilities of the adhesive-applied tapes were also evaluated in the same manner as Example 1. The results indicated satisfactory storage stability.

Comparative Example 1

The same procedure as in Example 1 was carried out except that an epoxy-based adhesive (Chemitoepoky TE-5701, product of Toray Industries, Inc.) was used as the adhesive.

The results of evaluating the resulting adhesive-applied tape are shown in Table 1.

Comparative Example 2

The same procedure as in Example 1 was carried out except that the adhesive used was the adhesive composition of Reference Example 5 which was obtained without using an aromatic diamine with a functional group reactable with epoxy resin.

The results of evaluating the resulting adhesive-applied tape are shown in Table 1.

Comparative Example 3

The same procedure as in Example 1 was carried out except that the adhesive used was the adhesive composition of Reference Example 6 obtained without mixing an epoxy resin.

The results of evaluating the resulting adhesive-applied tape are shown in Table 1.

TABLE 1

|  | Adhesive composition | 90° peel strength (g/cm) Adhesion conditions 1 | Soldering heat resistance 300° C. × 3 min | Squeeze-out, exudation during contact bonding |
| --- | --- | --- | --- | --- |
| Example 1 | Ref. Ex. 1 | 1350 | no blistering/ no peeling | none |
| Example 2 | Ref. Ex. 2 | 1110 | no blistering/ no peeling | none |
| Example 3 | Ref. Ex. 3 | 1230 | no blistering/ no peeling | none |
| Example 4 | Ref. Ex. 4 | 1410 | no blistering/ no peeling | none |
| Comp.Ex. 1 | commercial product | 1430 | blistering/ peeling | some |
| Comp.Ex. 2 | Ref. Ex. 5 | 530 | blistering/ peeling | some |
| Comp.Ex. 3 | Ref. Ex. 6 | 650 | no blistering/ no peeling | none |
| Adhesion conditions 1 | contact bonding conditions 10 Kg/mm² × 160° C. × 3 min | | heat treatment conditions 160° C. × 60 min | |

The tensile moduli of the adhesive compositions used in the examples and comparative examples are shown in Table 2 below.

TABLE 2

| | Adhesive Composition | Tensile modulus kgf/mm² |
| --- | --- | --- |
| Example 1 | Ref. Ex. 1 | 33.7 |
| Example 2 | Ref. Ex. 2 | 104.0 |
| Example 3 | Ref. Ex. 3 | 34.5 |
| Example 4 | Ref. Ex. 4 | 51.2 |
| Comp. Ex. 1 | commercial product | 210 |
| Comp. Ex. 2 | Ref. Ex. 5 | 30.5 |
| Comp. Ex. 3 | Ref. Ex. 6 | 27.5 |

According to the invention it is possible to obtain an adhesive-applied tape which does not require the high temperature, high pressure contact bonding conditions for heated contact bonding as in the production of conventional flexible printed boards and TAB boards, which undergoes substantially no warping, and which has excellent migration characteristics of the adhesive layer, no exudation of the adhesive, satisfactory storage stability and minimal squeeze-out when applied to metal foils.

What is claimed is:

1. An adhesive-applied tape which is formed by coating at least one side of a support film with an organic solvent solution of a polyimidosiloxane composition comprising a mixture of an epoxy resin and an amorphous polyimidosiloxane produced from an aromatic tetracarboxylic acid or a dianhydride or ester thereof, a diaminopolysiloxane and an aromatic diamine comprising an aromatic diamine having in the benzene ring at least one functional group which can react with an epoxy group, and then treating the coated layer at a temperature which produces substantially no curing of the epoxy resin, to provide a tack-free adhesive layer with no surface tackiness, and then covering the adhesive layer with a releasable protective film having surface tackiness while supplying in a thin layer a low boiling point organic solvent selected from the group consisting of ketone compounds, ether compounds and aromatic compounds having boiling points of from about 80 to 250° C. at an interface between the adhesive layer and the releasable protective film.

2. An adhesive-applied tape according to claim 1, wherein the adhesive layer contains a polyimidosiloxane composition prepared by mixing 1–50 parts by weight of an epoxy resin with 100 parts by weight of an amorphous polyimidosiloxane obtained by polymerizing and imidizing an amorphous polyimidosiloxane-yielding aromatic tetracarboxylic acid or a dianhydride or ester thereof, a diaminopolysiloxane and an aromatic diamine comprising an aromatic diamine having in the benzene ring at least one functional group which can react with an epoxy group.

3. An adhesive-applied tape according to claim 1, wherein the adhesive layer is a tack-free one obtained by subjecting the coated layer of the organic solvent solution of the polyimidosiloxane composition to heat drying at a temperature of 80–100° C.

4. An adhesive-applied tape according to claim 1, wherein the organic solvent of the polyimidosiloxane composition is a Glyme-type solvent.

5. An adhesive-applied tape according to claim 1, wherein the adhesive layer comprises an amorphous polyimidosiloxane obtained by using 2,3,3',4'-biphenyltetracarboxylic acid or a dianhydride or ester thereof as the aromatic tetracarboxylic acid or the dianhydride or ester thereof.

6. An adhesive-applied tape according to claim 1, wherein the support film is an aromatic polyimide film with a linear expansion coefficient (50–200° C.) of $0.4 \times 10^{-5}$–$2.5 \times 10^{-5}$ cm/cm/° C. and a thermal shrinkage (200° C.×2 hours) of 0.05% or lower.

7. An adhesive-applied tape according to claim 1, wherein the support film is an aromatic polyimide film with a thermal shrinkage of 0.05% or less when heated at 200° C. for 2 hrs.

8. An adhesive-applied tape according to claim 1, wherein the polyimidosiloxane composition has a tensile modulus (25° C.) of 10–150 kgf/mm$^2$ as measured with a 25 μm-thick film prepared by heat drying the composition at 80° C. for 60 minutes.

9. An adhesive-applied tape according to claim 1, wherein the organic solvent composition of the polyimidosiloxane composition further comprises an inorganic filler in an amount of 2 to 150 parts by weight per 100 parts by weight of the amorphous polyimidosiloxane.

10. An adhesive-applied tape according to claim 1, wherein the thickness of the low boiling point organic solvent layer is from about 1 to 3 μm.

* * * * *